Patented Feb. 24, 1931

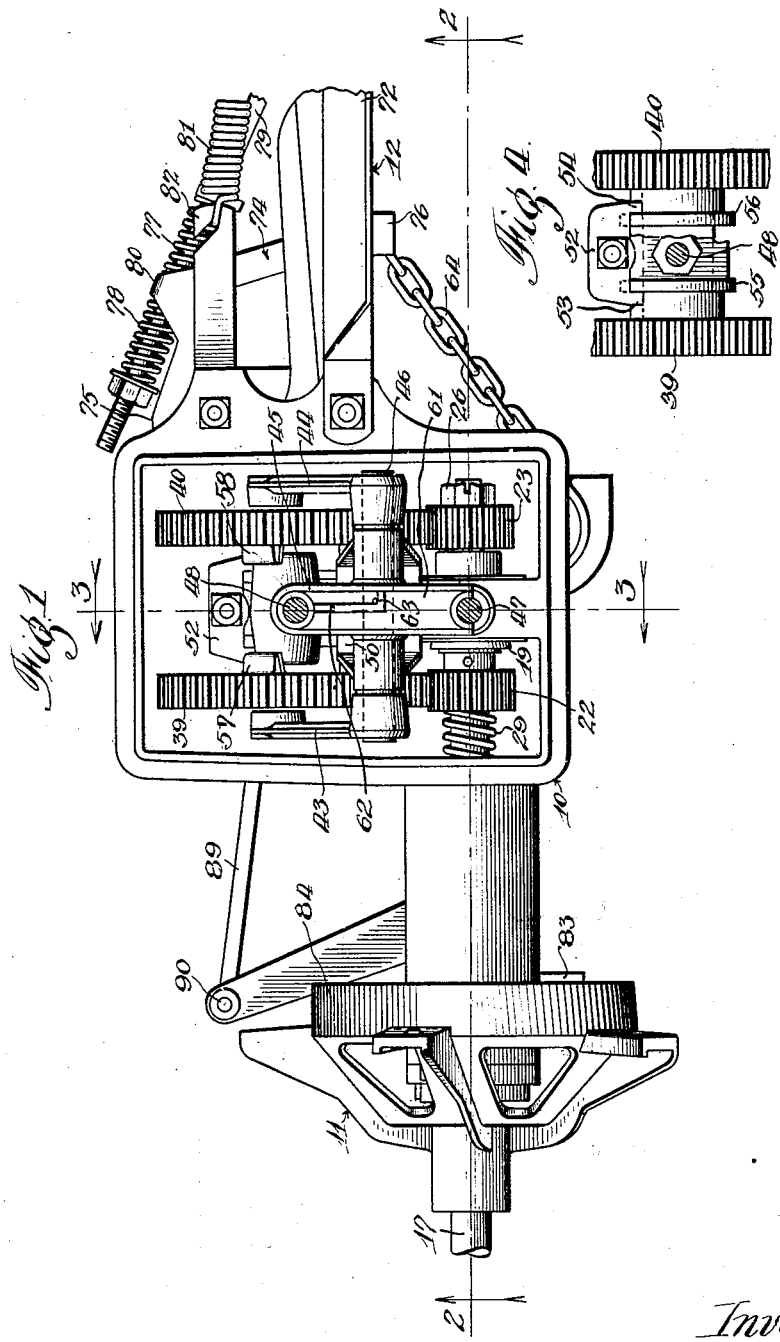

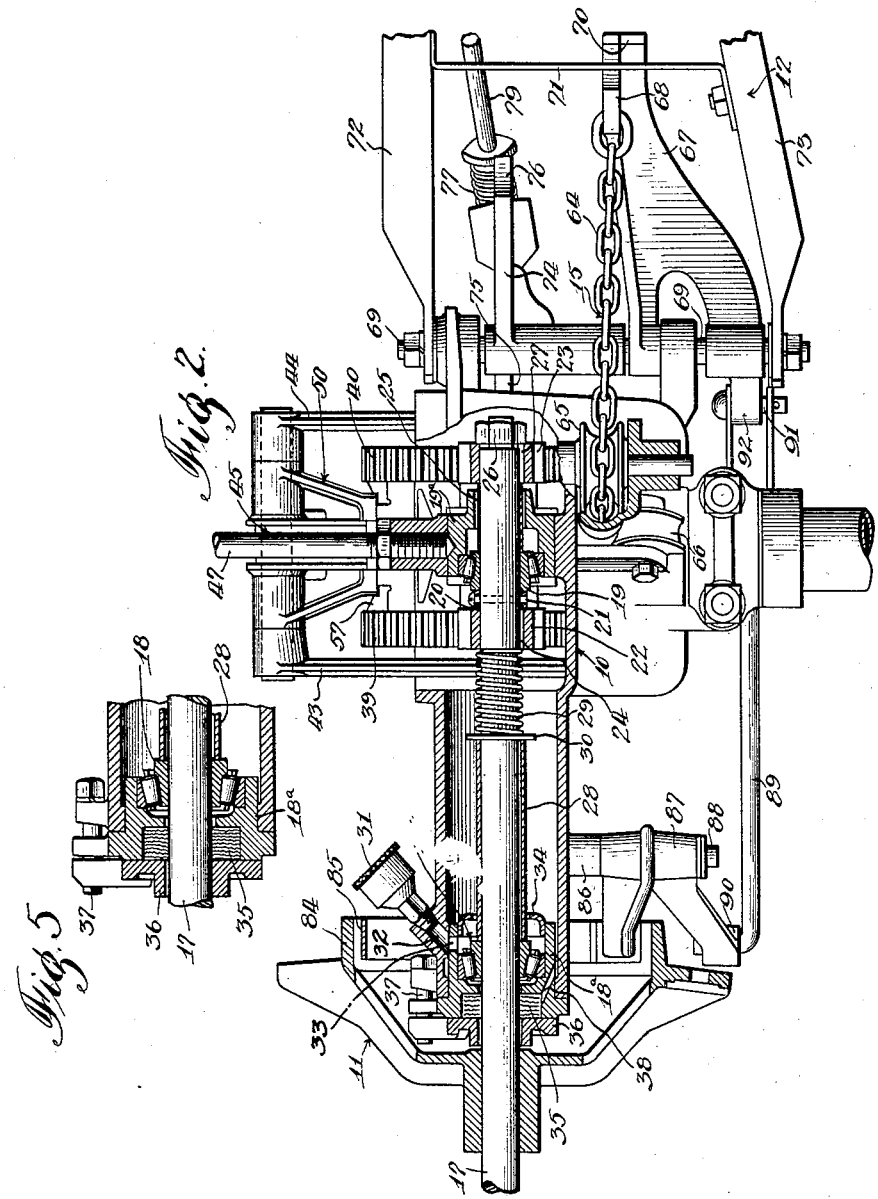

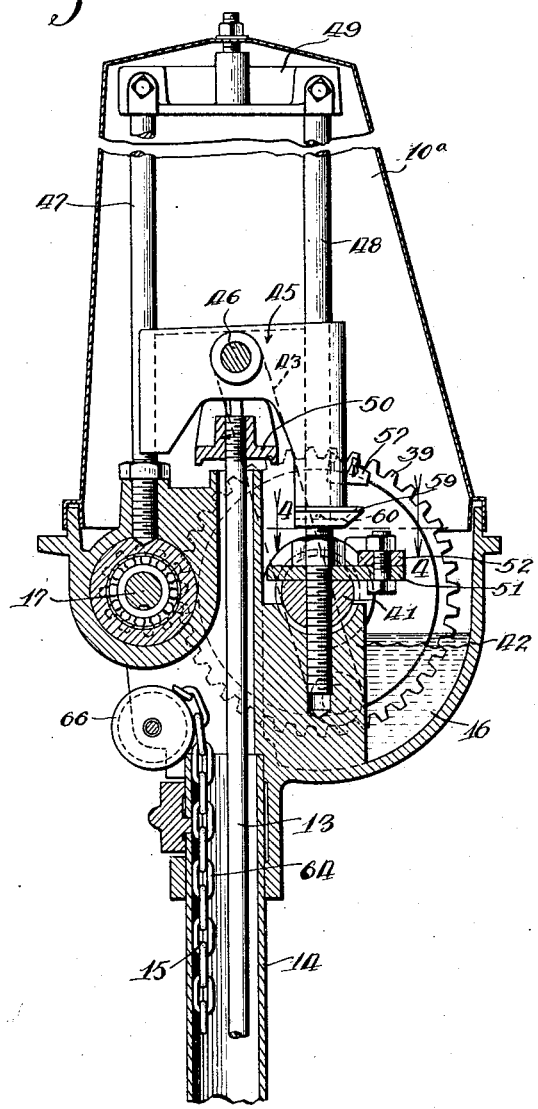

1,794,189

UNITED STATES PATENT OFFICE

HERMAN M. LOEBER, OF BEATRICE, NEBRASKA, ASSIGNOR TO DEMPSTER MILL MANUFACTURING CO., OF BEATRICE, NEBRASKA, A CORPORATION OF NEBRASKA

WINDMILL CONSTRUCTION

Original application filed November 8, 1926, Serial No. 146,967. Divided and this application filed June 11, 1928. Serial No. 284,361.

This application is a division and a continuation of the application Serial No. 146,967 filed Nov. 8, 1926.

This invention relates to a windmill construction and has special reference to a new and novel method of oiling the operating mechanism of a windmill construction.

More particularly, this invention relates to a construction comprising conveyors on the rotatable gear mechanism for conveying oil from the housing or reservoir to a reciprocating cross head, the oil being subsequently distributed on the guide rods for the cross head and to the bearings for the remaining movable elements.

For a more complete understanding of the characteristic features of this invention, reference may be had to the following description and accompanying drawings, in which latter:

Figure 1 is a top plan view of the windmill construction with the cover or hood removed;

Figure 2 is a side view partially in section taken on the line 2—2 of Fig. 1;

Fig. 3 is a vertical sectional view taken on the line 3—3 of Fig. 1;

Fig. 4 is a top plan sectional view taken on the line 4—4 of Fig. 3; and

Fig. 5 is a sectional view of a further embodiment of the end of the tubular portion of this device.

In the drawings, the construction shown therein comprises a main frame or head 10, a wind wheel (not shown) mounted on the hub 11, a vane (not shown) mounted on the vane stem 12, and the transmission from the wind wheel 11 to the pump rod 13, all of said elements being mounted on the main frame or head 10. The head 10 is mounted on a rotatable tubular stem 14, which stem contains the pull-out mechanism 15 for throwing the mill out of gear.

The head 10 is so designed as to provide a housing for containing a substantial supply of lubricant 16, which lubricant is conveyed to the various parts of the operating mechanism by a method which will be hereinafter disclosed.

The wind wheel hub is mounted on a wheel shaft 17, which shaft is carried in the bearings 18 and 19, the outer members or cups of which are contained in the housings 18a and 19a which in turn are supported by the main frame 10. These bearings 18 and 19, which are of the tapered roller type, are adapted to take the radial load of the wind wheel while said bearing 19 is also adapted to take the thrust load through the spacer 20 secured to the shaft 17 by the pin 21, said spacer 20 being disposed adjacent said bearing 19. It will be apparent that the thrust load, due to wind pressure on the wind wheel, tends to urge the wheel shaft 17 laterally and is limited by means of the spacer 20 abutting the bearing 19 which is fixed to the main frame.

A pair of pinions 22 and 23 are mounted on the wheel shaft 17, one on each side of the bearing 19, the pinion 22 being secured to the shaft 17 adjacent the spacer 20 by means of a key 24 and the pinion 23 being clamped with a spacer 25 and the cone of the bearing 19 against the spacer 20 by the nut 26, said pinion being held from rotation on said shaft by a key 27. By removing the nut 26 and the pinion 23, this construction permits the removal of the shaft 17 and the parts mounted thereon, bolts 37 being removed, without disturbing the housing or main frame and the remaining parts which said housing contains. An optional method of removing shafts 17 and the parts mounted thereon is to unscrew the guide rods 47 and 48 and, with bolts 37 removed, the entire assembly including the pinions 22 and 23 may be removed.

The cone of the outer wheel shaft bearing member 18 is held in place and kept in adjustment by a spacer 28 and a spring 29 bearing thereagainst. A washer 30 is interposed between said spacer and said spring to act as an oil thrower, that is, to prevent an excessive amount of oil from the reservoir from working out along the wheel shaft 17 into the outer bearing 18 and thence on the wheel hub 11. The outer bearing 18 is adapted to be lubricated with grease by means of the grease cup 31 inserted in passageway 32 in the main frame and with a communicating passageway 33 in the bearing housing 18a, which latter permits the grease to enter the bearing recess. The grease is kept from working out of the bearing by means of a cup-shaped member 34 on one side of the bearing and a felt washer 35 on the other side of said bearing. This washer is retained by a plate 36 which member and the housing 18a are secured to the main frame by bolts 37. A drain hole 38, also in said housing 18a, permits any accumulation of oil to drain back into the main frame.

Referring particularly to Figure 5, a construction is shown whereby the grease cup 31, passageways 32 and 33, drain hole 38 and the cup-shaped member 34 are eliminated. It has been found that a sufficient amount of oil will work out along the shaft 17 past the oil thrower 30 to properly lubricate the outer bearing 18. The felt washer 35, as heretofore indicated, prevents the escape of oil outward around the shaft 17.

A pair of large gears 39 and 40 are loosely mounted on a stud shaft or trunnion 41 and engage the pinions 22 and 23 respectively. The trunnion 41 is, in turn, rigidly mounted on a suitable bracket 42, which latter is preferably cast integral with the housing or main frame 10. These large gears 39 and 40 are connected by means of pitmen 43 and 44 to a cross-head 45, one end of each of said pitmen being pivotally connected to a pin 46 extending through said cross-head. The cross-head 45 is arranged to slide upon a pair of guide rods 47 and 48, both rods being threaded into the main frame 10 and connected at their upper ends by a spacing bracket 49, which bracket acts also as a fastening for hood cover 10a, which hood serves to keep out rain and dirt and also prevent loss of the lubricant. The pump rod 13 is fastened at its upper end to a pump-rod carrier 50, which carrier comprises a substantially U-shaped bracket member which is pivotally mounted on the pin 46, the arms or bearing portions of the bracket being disposed between the pitmen and the cross-head 45. This construction takes the load off the cross-head, whereby said cross-head acts only in the capacity of a guiding member.

The guide rod 48 also serves to lock the trunnion 41 in position on its bracket 42, and moreover, serves to hold a plate 51 in position on a flattened portion of the trunnion 41. This plate 51 acts as a support for a positioning member 52 which has flanged portions 53 and 54 arranged to overlap the outwardly extending flanges 55 and 56 on the hubs of the gears 39 and 40 respectively, and in this manner the gears are kept in their proper positions on the shaft or trunnion 41.

In the operation of the pumping mechanism, motion is transmitted by means of the wind wheel hub 11 through the wheel shaft 17, the pinions 22 and 23, the gears 39 and 40, the pitmen 43 and 44, and the pump-rod carrier 50 to the pump rod 13, the pitmen serving to translate the rotary motion of the gearing into a reciprocating movement in the pump rod.

The lubrication of the guide rods 47 and 48 and the pin 46 is accomplished by oil being carried upwardly by a pair of oil conveyors 57 and 58 projecting from the side of the rim of each gear 39 and 40 respectively. These conveyors drip the oil into an oil receiver 59 on the lower end of the cross-head 45. The oil then passes from the receiver 59 through a pair of small holes 60 in the cross-head to the guide rod 48 where it is worked upwardly by the motion of the cross-head and is sheared off into an inclined oil channel 61 at the top of the cross-head. The oil channel is divided by a rib 62 which permits part of the oil to be carried to the opposite guide rod 47 and the remainder to be guided down through a hole 63 to lubricate the pin 46. The lubrication of the gears and the remaining bearings is performed by the oil picked up by the gears as they rotate, the gears flooding themselves and the bearings.

The pull-out construction for throwing the mill out of gear comprises a pull chain 64, running over the pulleys 65 and 66 mounted on the main frame, and a rock arm 67 to which the chain 64 is connected at 68. This rock arm 67 is mounted on the vertically pivoted pin 69 on which the vane stem 12 is also pivotally mounted and said rock arm is provided with an abutment portion 70 which engages the strut 71 extending between, and secured to, the members 72 and 73 of the vane stem 12. This loose engagement between the rock arm 67 and the strut 71 enables the windmill to regulate itself in the wind by permitting pivotal movement of the head with respect to the vane without interference from the pull-out rock arm.

In order to provide a cushioning effect for the throwing in-and-out of gear of the mill, a pivoted buffer member 74 is provided having an abutment portion 75 for limiting the throwing-in-movement of the mill, and another abutment portion 76 for limiting the throwing-out-movement of the mill. The buffer or cushioning member 74 is pivotally mounted on the pin 69 which pin is the same as that on which the vane stem and the throw-out arms are pivoted. In order to provide a connection between the buffer member 74 and the vane stem 12, which will yield in both directions, a pair of coil compression springs 77 and 78 are provided through which the connecting rod 79 extends. One end of this connecting rod 79 is pivotally secured to the vane stem, and the other end extends through an opening in a lug 80 in the buffer member 74. In order to throw the mill into gear and to hold the mill in the wind against the unbalanced pressure on the wind wheel, a heavy coil tension spring 81 is provided, one end of which is secured to the vane stem and the other end is secured to a hook 82 mounted on the main frame 10. This construction may also be adjusted to regulate the speed at which the mill runs.

In operation, when the pull-out chain 64 is released to allow the spring 81 to throw the mill into gear, the abutment portion 75 of the buffer member engages the side of the head 10 and the buffer spring 77 acts as a cushion to bring the further relative movement between the head and the vane stem to a stop.

On the other hand, when the mill is thrown out of gear by pulling down on the chain 64, the abutment portion 76 of the buffer member engages the side of the head 10, whereupon the relative motion between the head and the vane stem is brought to a stop by the cushioning spring 78.

In order to hold the wind wheel against rotation when the mill is out of gear, the hub of the wind wheel is provided with an internal annular breaking surface, as at 84, with which cooperates an internal expanding brake band 85. The brake band is mounted on a bracket 83 secured to the main frame 10.

The brake band 85 is forced outwardly into braking position when the mill is thrown out of gear by means of a bell crank 87 pivotally mounted to swing about a vertical axis by means of a pin 88 secured to a projection 86 on the main frame. This bell crank is operated from the pull-out arm 67 by means of a link 89 pivotally connected at 90 to the bell crank and also pivotally connected by pin 91 to an arm 92 formed integral with the pull-out arm 67.

While a single embodiment of this invention is herein shown and described, it is to be understood that the device is not to be limited to that specific structure since various modifications may be apparent to those skilled in the art without departing from the spirit and scope of this invention, and therefore, the same is to be limited only by the scope of the appended claims and the prior art.

I claim:

1. In a windmill the combination of a wind wheel, a housing for containing a lubricant, a shaft supported in said housing and upon which said wind wheel is mounted, pinions mounted on said shaft, gears for engaging said pinions, a pump rod, guide rods mounted on said housing, a cross-head for carrying said pump rod and mounted on said guide rods, pitmen for connecting said gears and said cross-head, an oil receiver on the lower end of said cross-head, and a drip edge on the rim of said gears and arranged to project therefrom to overlap said oil receiver at one point in the rotation of said gears.

2. In a windmill the combination of a wind wheel, a housing for containing a lubricant, a shaft supported in said housing and upon which said wind wheel is mounted, pinions mounted on said shaft, gears for engaging said pinions, a pump rod, guide rods mounted on said housing, a cross-head for carrying said pump rod and mounted on said guide rods, pitmen for connecting said gears and said cross-head, an oil reservoir carried by said cross-head, and an oil elevator on said gears for elevating said lubricant to said reservoir.

3. In a windmill the combination of a wind wheel, a housing for containing lubricant and arranged to support said wind wheel, a cross-head, a pump rod carried by said cross-head, gear means for transmitting power from said wind wheel to said pump rod, an oil reservoir carried by said cross-head, and means carried by said gears for elevating said lubricant to said reservoir.

4. In a windmill the combination of a wind wheel, a housing for containing a lubricant, a shaft supported in said housing and upon which said wind wheel is mounted, pinions on said shaft, a pump rod, guide rods mounted on said housing, a cross-head for carrying said pump rod and mounted on said guide rods, gears for engaging said pinions, pitmen for connecting said gears and said cross-head, a wrist pin for pivotally connecting said pitman and said cross-head, oil elevators for elevating oil from said housing, an oil receiver on the lower end of said cross-head for receiving oil from said elevators and directing said oil to one of said guide rods, an oil reservoir on the top side of said cross-head for receiving oil which is fed thereto by means of the motion of the cross-head on said last mentioned guide rod and for distributing said oil to the other of said guide rods and said wrist pin.

5. In a windmill the combination of a wind wheel, a housing for containing lubricant and arranged to support said wind wheel, a cross-head, guide rods upon which said cross-head is mounted, a pump rod, a wrist pin for pivotally connecting said cross-head and said pump rod, means for transmitting power from said wind wheel to said pump rod, an oil receiver carried on the lower end of said cross-head and in communication with one of said guide rods, means for elevating said oil to said reservoir, and means whereby said oil is directed from said last mentioned guide rod to the other of said guide rods and said wrist pin.

6. In a windmill the combination of a wind wheel, a housing for containing lubricant and arranged to support said wind wheel, a cross-head, guide rods upon which said cross-head is mounted, a pump rod, oscillatory means for transmitting power from said wind wheel to said pump rod, an oil reservoir carried by said cross-head and in communication with one of said guide rods, means on said power transmitting means for elevating said oil to said reservoir, and means whereby said oil is directed from the first guide rod to the other of said guide rods.

7. In a windmill the combination of a wind wheel, a housing for containing lubricant and arranged to support said wind wheel, a cross-head, guide rods upon which said cross-head is mounted, a pump rod carried by said cross-head, oscillatory means for transmitting power from said wind wheel to said pump rod, an oil channel carried by said cross head for connecting the slidable and movable parts thereof, and means on said power transmitting means for elevating oil to said oil channel.

8. In a windmill the combination of a wind wheel, a housing for containing a lubricant and arranged to support said wheel, a cross-head, a pump rod carried by said cross-head, oscillatory means for transmitting power from said windmill to said cross-head, an oil reservoir carried by said cross-head, and means on said power transmitting means for elevating said lubricant to said reservoir.

In witness whereof, I have hereunto subscribed my name.

HERMAN M. LOEBER.